United States Patent [19]
Goossen

[11] Patent Number: 5,914,804
[45] Date of Patent: Jun. 22, 1999

[54] DOUBLE-CAVITY MICROMECHANICAL OPTICAL MODULATOR WITH PLURAL MULTILAYER MIRRORS

[75] Inventor: Keith Wayne Goossen, Aberdeen, N.J.

[73] Assignee: Lucent Technologies Inc, Murray Hill, N.J.

[21] Appl. No.: 09/014,983

[22] Filed: Jan. 28, 1998

[51] Int. Cl.⁶ .......................... G02B 26/00; G02B 26/08
[52] U.S. Cl. .................. 359/291; 359/247; 359/295; 359/318; 359/290
[58] Field of Search ..................... 359/290, 291, 359/295, 318, 247, 248

[56] References Cited

U.S. PATENT DOCUMENTS

| | | | |
|---|---|---|---|
| 5,500,761 | 3/1996 | Goosen et al. | 359/290 |
| 5,589,974 | 12/1996 | Goossen et al. | 359/290 |
| 5,654,819 | 8/1997 | Goossen et al. | 359/248 |
| 5,808,781 | 9/1998 | Arney et al. | 359/291 |

OTHER PUBLICATIONS

Aratani et al., Proc. IEEE Microelectromech Workshop, Ft. Laud., Fla, Feb. 7–10, 1993 at 230–35.

*Primary Examiner*—Georgia Epps
*Assistant Examiner*—Margaret Burke

[57] ABSTRACT

A mechanical modulator is provided that includes a conductive substrate and at least three multilayer mirrors disposed on the substrate. The mirrors are spaced apart from one another to define upper and lower optical cavities. The upper cavity is formed by an airgap having a variable thickness. The multilayer mirror located above the airgap includes a conductive membrane having an optically transparent portion and a flexible support for orienting the membrane in a first position. Under the action of a bias, the membrane moves to a second position, changing the air gap by a fraction of a wavelength of the optical signal, as measured in air. The change in position of the membrane from the first to the second position causes a change in the total reflectivity of the modulator from a minimum to a maximum value.

13 Claims, 5 Drawing Sheets

DOUBLE-CAVITY MICROMECHANICAL OPTICAL MODULATOR WITH PLURAL MULTILAYER MIRRORS

FIELD OF THE INVENTION

This invention relates generally to optical modulators, and more particularly to surface normal mechanical optical modulators.

BACKGROUND OF THE INVENTION

It is desirable in optical wavelength-division multiplexing networks to have inexpensive light modulators that have high contrast and wide optical bandwidths. In certain cases, such as audio and video transmission, these modulators need only operate at frequencies up to several megahertz.

A modulation device particularly well suited for the above application is a surface normal micromechanical modulator. This device may be described as having a variable air gap defined by two layers of material. Typically, surface normal light modulators operate by changing the amount of light reflected in the surface normal direction, i.e., the direction normal to the substrate surface. This may be achieved by varying the variable air gap, which alters the optical properties of the device.

Compared with other modulation means, such as a laser, micromechanical modulators are limited in terms of modulation frequency. However, the micromechanical modulators are less expensive to implement and are readily fabricated on silicon substrates facilitating integration with silicon based electronics. Further, unlike the typical semiconductor laser, micromechanical modulators operate in a surface normal manner. This is an attractive feature since a device which operates in this manner requires less wafer space than a device, such as a typical semiconductor laser, in which the operating cavity is formed in the plane of the wafer. Many thousands of surface normal modulators may be formed on a single wafer, minimizing cost. Thus, where the operating frequency is limited, the micromechanical modulator may be the modulation device of choice. One such micromechanical modulator has been described by Aratani et al. in "Process and Design Considerations for Surface Micromachined Beams for a Tuneable Interferometer Array in Silicon," Proc. IEEE Microelectromech Workshop, Ft. Laud., Fla., Feb. 7–10, 1993 at 230–35. This article, and all other articles referenced in this specification are herein incorporated by reference in their entirety. Aratani's modulator is described as having a diaphragm mirror consisting of a polysilicon/silicon nitride multilayer supported by thin beams over a substrate, also partially mirrored by a polysilicon/silicon oxide multilayer. As a voltage is applied between the membrane and the substrate, the membrane is pulled toward the substrate. The device is said to behave as a Fabry-Perot interferometer wherein, given two mirrors having equal reflectivity, the reflectivity of the device approaches zero at the resonant wavelength of the cavity. As the membrane moves, altering the cavity, the reflectivity of the device rises. The change in reflectivity modulates the optical signal. While a large change in reflectivity is said to be achieved, the optical bandwidth of the optical resonator based modulator is limited. The contrast ratio of such a device falls off sharply as the wavelength of the incident light varies from the resonant wavelength of the device.

U.S. Pat. No. 5,500,761 discloses a mechanical modulator that is formed on a semiconductor wafer. The modulator includes a membrane and a substrate, spaced to form an air gap. The membrane consists of one or more layers, and is suspended over the substrate by support arms. Bias is applied to the membrane and the substrate to create an electrostatic force to move the membrane towards the substrate. The layers of the membrane are characterized in that there is a relationship between the refractive indices of the layers and the refractive index of the substrate. Each layer of the membrane has a thickness which is approximately equivalent to one-quarter of the wavelength of an optical signal to be modulated. In operation, the air gap, in the unbiased state, is a multiple of one-quarter of a wavelength of the optical signal. Where the air gap is an odd multiple of one-quarter wavelength, the membrane and air gap function as a high reflectivity coating. Where the air gap is an even multiple of one-quarter wavelength, the membrane and air gap function as an anti-reflection coating. Under the action of bias, the membrane moves through one-quarter of a wavelength to an anti-reflection state or a maximum reflection state depending upon the state of the unbiased membrane. In the second arrangement, the membrane does not contact the substrate. One advantage of this modulator over that disclosed by Aratani et al. is that it offers a broader resonance due to its large finesse. However, whereas the Aratani et al. modulator provides high contrast (i.e., the ratio of light reflected in its reflective state to its anti-reflective state), the modulator disclosed by Goossen et al. achieves a reflectivity of no more than 72% and thus its insertion loss is undesirably high for many applications.

It would therefore be desirable to provide a mechanical modulator that offers a broad resonance with low insertion loss.

SUMMARY OF THE INVENTION

In accordance with the present invention, a mechanical modulator is provided that includes a conductive substrate and at least three multilayer mirrors disposed on the substrate. The mirrors are spaced apart from one another to define upper and lower optical cavities. The lower cavity has a fixed thickness approximately equal to a multiple of one-half of a wavelength of the optical signal, as measured within the lower cavity. The upper cavity is formed by an airgap having a variable thickness that in a first state is approximately equal to a multiple of one-half of a wavelength of the optical signal, as measured within the upper cavity. The total reflectivity of the multilayer mirrors approaches a minimum value when the upper cavity is in its first state. The multilayer mirror located above the airgap includes a conductive membrane having an optically transparent portion and a flexible support for orienting the membrane in a first position. Under the action of a bias, the membrane moves to a second position, changing the air gap by a fraction of a wavelength of the optical signal, as measured in air. The change in position of the membrane from the first to the second position causes a change in the total reflectivity of the modulator from a minimum to a maximum value.

By employing a fixed-length optical cavity in combination with a variable-length optical cavity, the present invention yields a modulator characterized by a broad resonance and low loss.

DETAILED DESCRIPTION OF THE INVENTION

Figure 1:
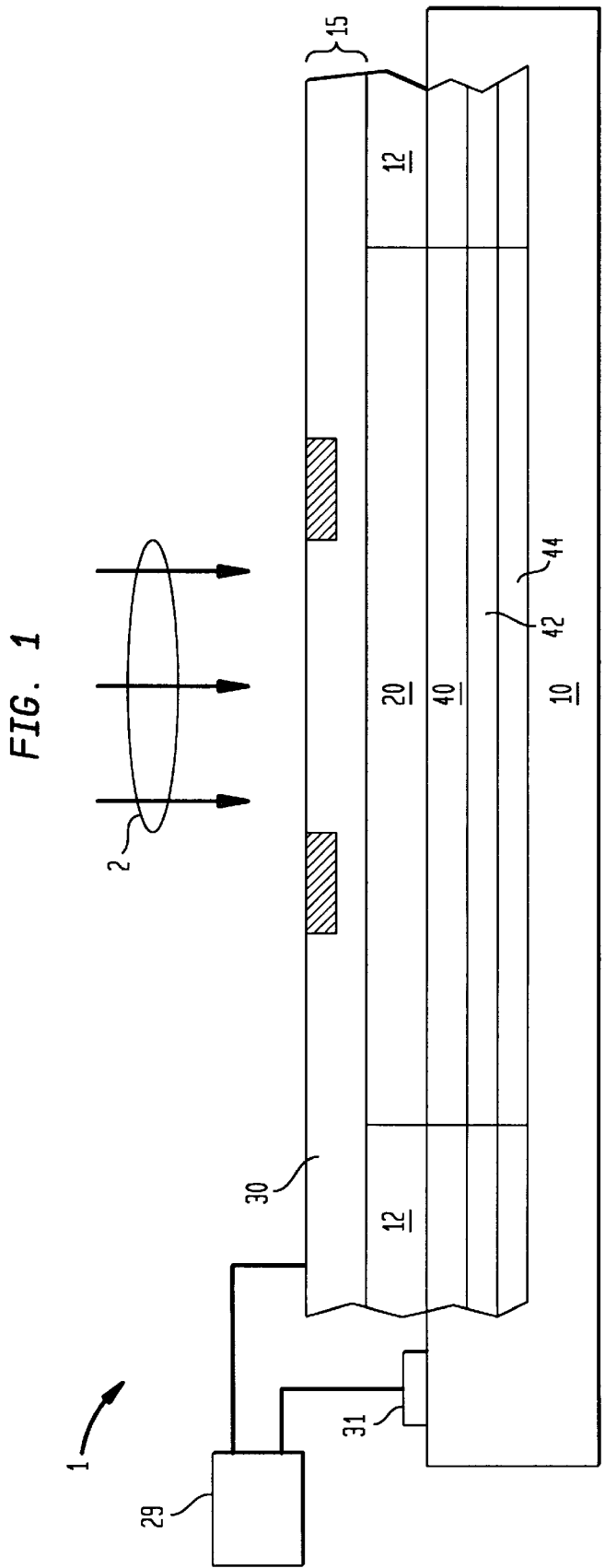
FIG. 1 is a side view of an embodiment of a micromechanical modulator according to the present invention where the modulator is shown in its unbiased position.
Figure 2:
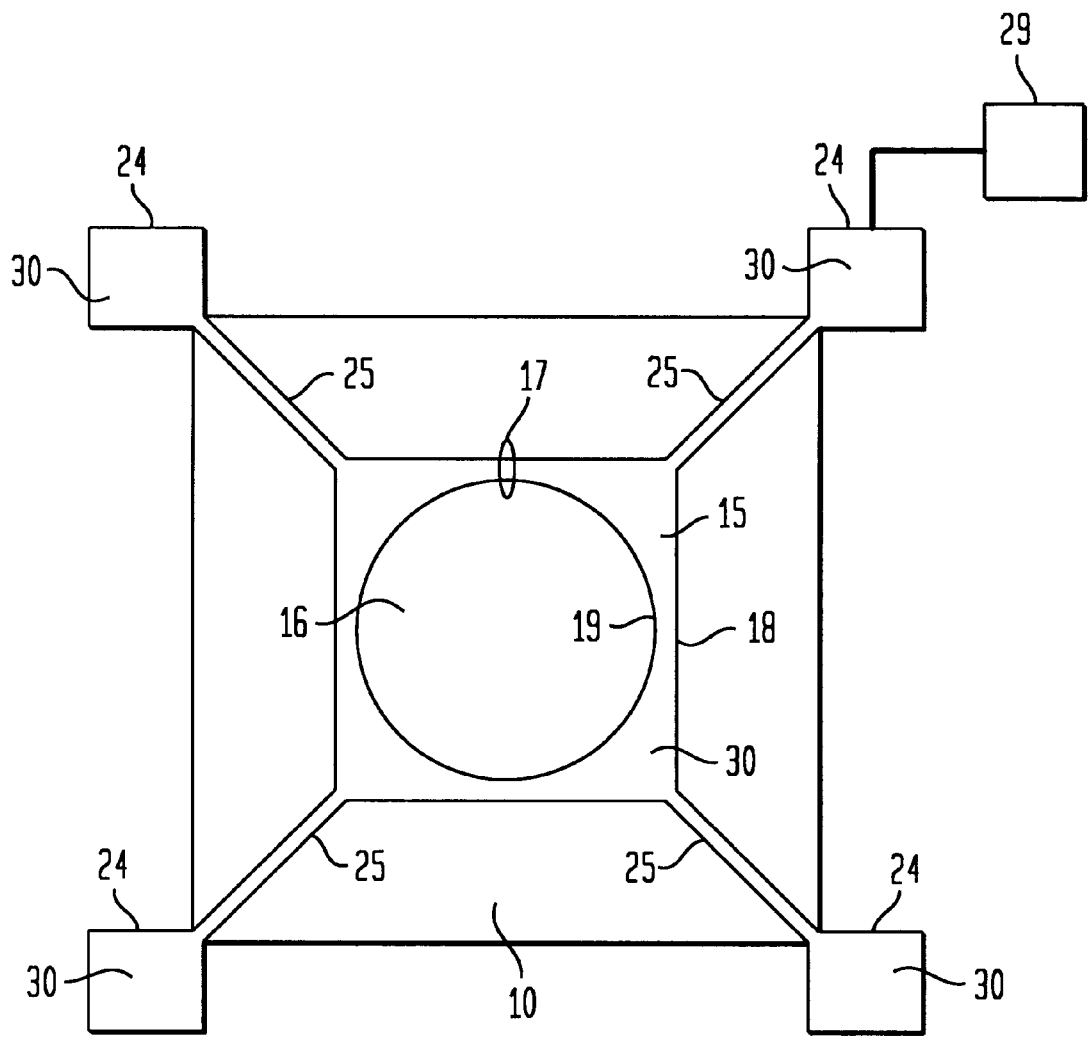
FIG. 2 is a plan view of the micromechanical modulator of FIG. 1.
Figure 3:
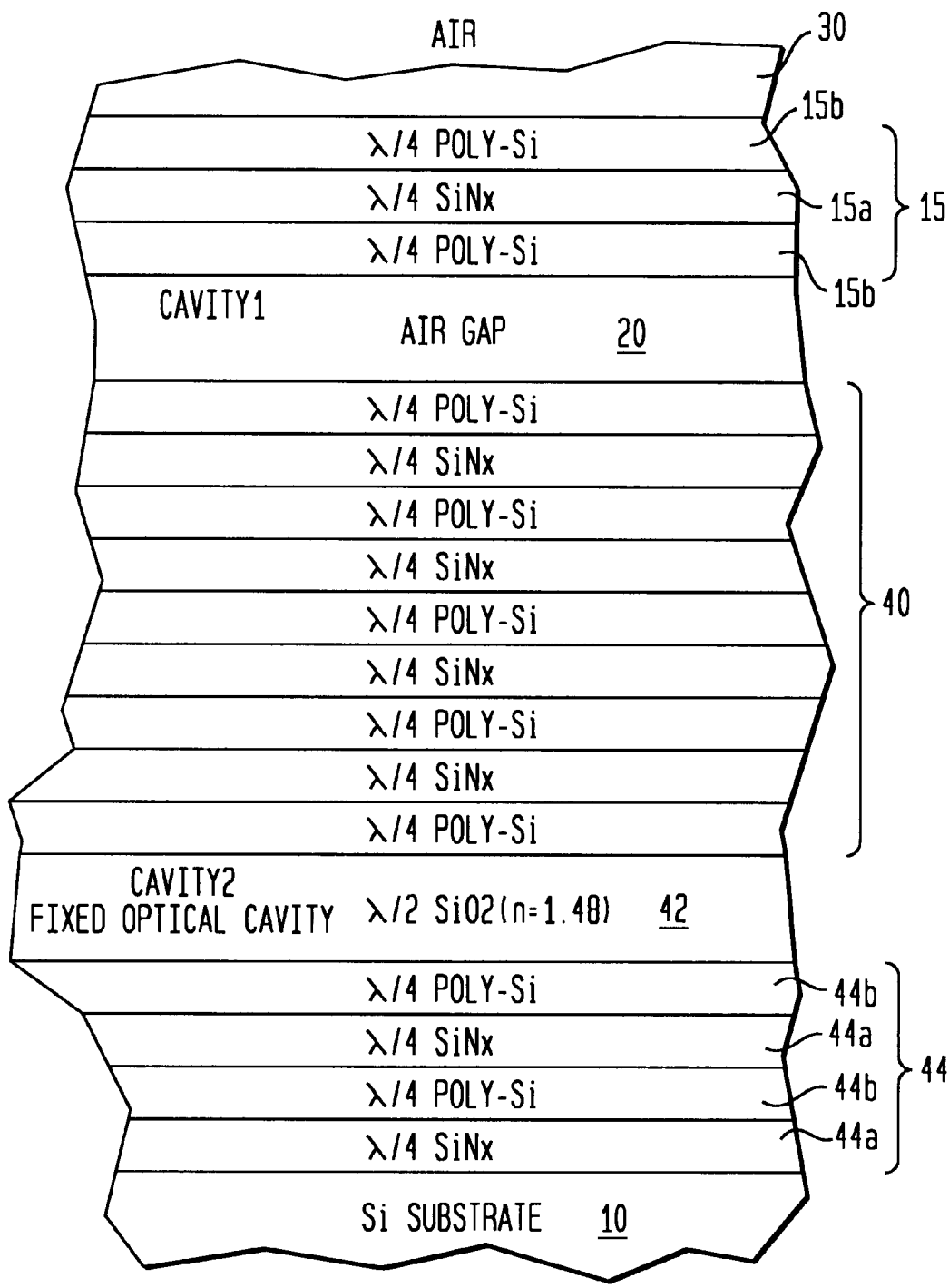
FIG. 3 shows a detailed view through the multilayers indicated in FIG. 1.

FIGS. 1–3 show an embodiment of a micromechanical modulator 1 according to the present invention. As shown in FIG. 1, which is a cross-sectional view through line aa in FIG. 2, the device comprises a mirror membrane 15, an intermediate multilayer mirror 40, a third multilayer mirror 44 and a substrate 10. The membrane 15, which may have one or more layers, such as layers 15a, 15b, is spaced apart from intermediate mirror 40 to define an air gap 20 between them. The airgap 20 constitutes a first optical cavity. Intermediate mirror 40 and third multilayer mirror 44 are spaced apart from each other to define a fixed optical cavity 42.

As shown in FIG. 2, which is a plan view of the apparatus of FIG. 1, the membrane 15 is suspended over the air gap 20 by support arms 25. The membrane 15 may also comprise an electrode 30, and the substrate 10 may also comprise an electrode 31. The electrodes 30 and 31 are provided so that a voltage may be applied across the membrane 15 and the substrate 10 to create an electrostatic force to move the membrane towards the substrate.

The substrate 10 may be formed of a conductive material, which is either transparent or absorbing over the operating optical bandwidth. Suitable materials include, but are not limited to, silicon, gallium arsenide, indium phosphide, germanium or indium tin oxide (ITO) coated glass. If a semiconductor material is used for the substrate, it should be appropriately doped. Preferably, the substrate is silicon, which should be doped with any Group III or Group V element, typically phosphorus or boron.

The inventive modulator is configured so that its reflectivity varies between a maximum and minimum state as air gap 20 undergoes a change in thickness of $m\lambda/4$. This is accomplished by forming the optical cavities 20 and 42 with a thickness equal to $m\lambda/2$ (as measured in the material comprising the respective layers). In addition, the layers forming the mirrors 15, 40 and 44 have a thickness of $m\lambda/4$ (as measured in the material comprising the respective layers). The materials comprising multilayer mirrors 15, 40 and 44 are selected so that the total reflectance of the mirrors 15, 40 and 44 approaches zero when the thickness of the optical cavities 20 and 42 is $m\lambda/2$.

As shown in greater detail in the particular embodiment of the invention shown in FIG. 3, the membrane 15 may comprise a single optically active layer 15a of material such as silicon oxide, or, more preferably, silicon nitride, for example. The membrane 15 may also include one or more optional layers 15b of material. The layer or layers 15b will typically be formed of the same material as the substrate 10, preferably silicon. If silicon is used for the optional layers 15b, it may have a polycrystalline structure, such as polysilicon, or it may have an amorphous or single crystal structure. Layers 15b function as strained layers for producing tension in the membrane 15. Where the membrane 15 comprises only two layers, the sole optional layer 15b is nearest to the substrate 10.

As previously noted, the thickness of each of the multilayer mirrors 15, 40 and 44 is measured in terms of the wavelength of an incident optical beam 2, as measured in the material comprising the layers. Where the incident optical beam 2 has a single wavelength, the mirror thicknesses are readily determined. However, the incident optical beam 2 may be comprised of a number of spectral components of differing wavelengths. For example, the incident optical beam 2 may have a bandwidth extending from 1300 nm to 1550 nm. In such a case, the wavelength selected as the basis (the basis wavelength) for each mirror thickness is determined by selecting the wavelength at the mid-point of the desired bandwidth.

The flexible support arms 25, which suspend the membrane 15 above the intermediate mirror 40, may be arranged in any convenient manner and may number more or less than four. The flexible support arms 25 serve as a support means for the membrane 15 and also allow the membrane to move relative to the intermediate mirror 40. While a single structure, i.e., the support arms, provides this dual function, these functions could be provided by independent structures. For example, a rigid support used in conjunction with a separate flexing member can provide support and mobility for the membrane 15. Other configurations and arrangements capable of supporting the membrane 15, and allowing it to move, are within the contemplated scope of the present invention; it being recognized that such variations will occur to those skilled in the art in view of the present teachings. In addition, the support arms 25 may be part of the membrane 15, or, alternatively, may be a separate structure formed of a different material.

Electrodes 30 may comprise a layer of conductive material deposited on the remainder of layer 15. Any suitably conductive material may be used to form the electrodes, including, but not limited to, aluminum, platinum, tungsten, conducting silicon, or, preferably, gold. The electrodes 30 form a continuous conductive layer covering at least a portion of the support arms 25 and the perimeter of the optically active layer 15a forming a border region 17. The electrodes may further include a region 24 extending beyond each support arm 25. Alternatively, the optional layer 15b of the membrane may be formed from a conductive material so that a separate electrode 30 is not required. An electrode 31 is formed on the substrate 10, as well. The separate electrode 31 is not required if the substrate 10 is suitably conductive. The electrodes, or conducting material if discrete electrodes are not provided, are in electrical contact with a controlled voltage source 29.

The inner edge 19 of the border region 17 defines an optical window 16 in the membrane 15. While the optical window 16 is shown to have a circular shape in FIG. 2, the window 16 may have any shape. The size of the optical window will vary with the particular application for which the invention is used. The optical window 16 must be sized so that the optical "spot" produced by the optical window will be captured by the numerical aperture of the waveguide or other optical device being used in conjunction with the invention. By minimizing the size of the optical window, the overall membrane size, and hence its mass, may be minimized. This reduction in mass results in a better response time for the modulator.

The micromechanical modulator 1 of FIGS. 1 and 2 may be formed by a variety of methods known to those of ordinary skill in the art. Pertinent details of one such method are disclosed in U.S. Pat. No. 5,500,761. In some embodiments of the invention, it may prove advantageous to fabricate the intermediate and third multilayer mirrors 40 and 44 and optical cavity 42 by a single method in a common reaction chamber. For example, if these layers comprise GaAs or AlAs, they may be fabricated by molecular beam epitaxy (MBE). In such cases it may remain advantageous to fabricate membrane 15 from silicon or silicon nitride to retain their desirable mechanical properties. One or ordinary skill in the art will further recognize that the inventive modulator may be fabricated in a variety of different configurations. For example, the optical cavities may be formed in a well located within substrate 10. Moreover, the present invention is not limited to Si, GaAs or AlAs, but rather many encompass other appropriate material sytems as well.

In operation, the inventive modulator functions as follows. If the air gap 20, in the unbiased position, has a thickness that is a multiple of one-half of the basis wavelength, the modulator functions in its minimum reflection state. As an electrical signal, such as a varying voltage, is applied to the electrodes 30 and 31, an electrostatic force is created between the membrane 15 and the substrate 10. This force causes the membrane to move toward the substrate. As the membrane 15 moves from its unbiased position, the reflectivity of the device changes. As the membrane 15 moves a fraction of the basis wavelength, a maximum reflectivity state will be encountered. Modulation of an optical signal is thus achieved by altering the reflectivity of the device.

By employing a fixed-length optical cavity in combination with a variable-length optical cavity, the present invention yields a modulator characterized by a broad resonance and low loss. That is, the present invention, offers the desirable features of the both the modulator disclosed by Aratani (low insertion loss) and the modulator disclosed in U.S. Pat. No. 5,500,761 (broad resonance). The fixed length optical cavity 42 provides a second resonance that is located at a fixed basis wavelength. When the resonance of the variable length optical cavity 20 is adjusted to suitably overlap the resonance of the fixed-length optical cavity 42, the bandwidth of combined resonance may be substantially greater than the bandwidth of the individual resonances.

It is preferred that modulators according to the present invention are formed and operated so that under the action of bias the membrane 15 moves towards the substrate 10. In other words, the size of the air gap 20 decreases under bias. Alternatively, it is within the contemplated scope of this invention that modulators be formed and operated so that the membrane 15 moves away from the substrate 10 under the action of bias, i.e., the air gap 20 increases. The optical properties of both versions are the same. Such a modulator may be formed by suspending an electrode, such as a ring of conductive material, above the membrane 15, i.e., on the side of the membrane furthest from the substrate. By applying a bias voltage across the ring and the membrane 15, an electrostatic attraction will be created, moving the membrane 15 toward the ring, and away from the substrate. The electrode is not limited to a ring of conductive material. However, the configuration should be such that the optical signal will pass through the electrode with minimal signal attenuation.

Alternatively, a bias current rather than a voltage, may be supplied to the inventive modulator. The current can be controlled to produce a magnetic repulsion between the membrane 15 and substrate 10 so that the membrane will move away from the substrate under the action of bias.

Figure 4:
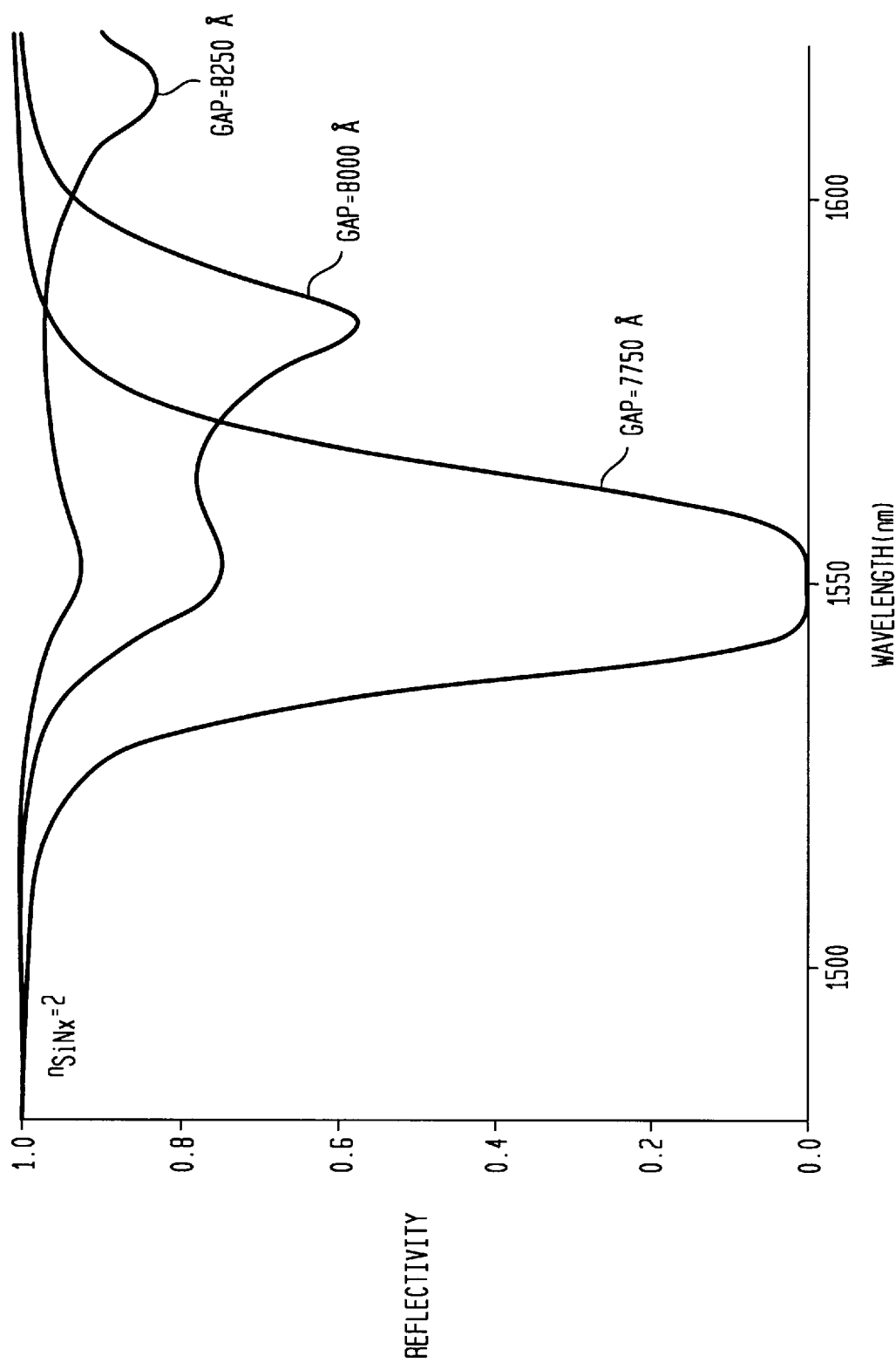
FIG. 4 shows the expected performance of one particular embodiment of the modulator shown in FIGS. 1–3.

FIG. 4 shows the expected performance for the inventive modulator in which the refractive index of the silicon nitride layer is two. The modulator includes a fixed optical cavity having a basis wavelength of 1550 nm and a variable optical cavity having a length of 8250 A (curve 30), 8000 A (curve 32) and 7750 A (curve 34). The two resonances from the two cavities are clearly visible in curves 30 and 32. Moreover, as curve 34 shows, the bandwidth of the modulator is greater than that of the Arantani reference and the contrast between maximum reflectivity and minimum reflectivity is greater than that shown in U.S. Pat. No. 5,500,761 (compare to FIG. 17 of the '761 patent).

Figure 5:
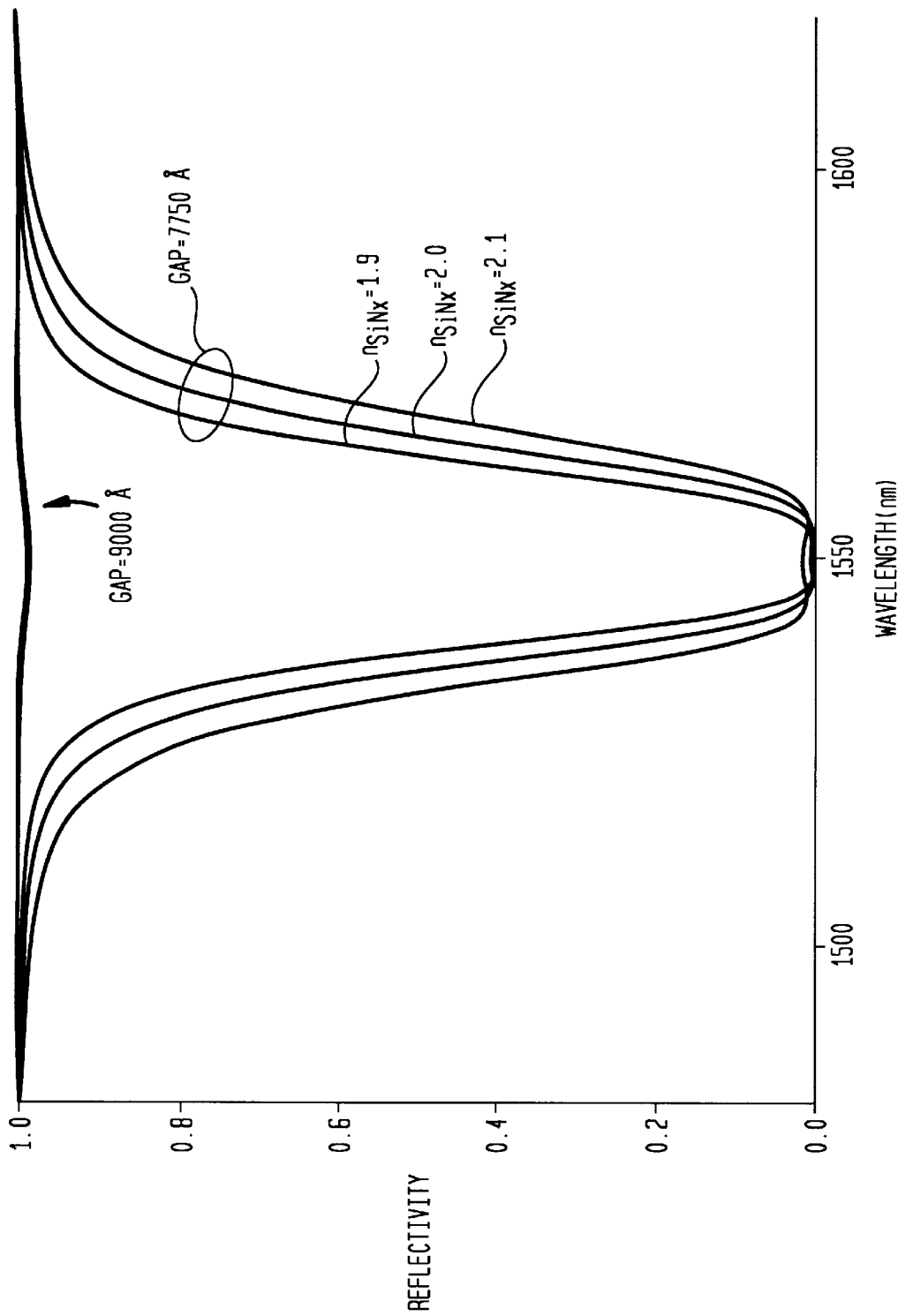
FIG. 5 shows the expected performance of three different modulators in which the silicon nitride layers have refractive indices of 1.9, 2.0 and 2.1, respectively.

FIG. 5 shows the expected performance of three different modulators in which the silicon nitride layers have refractive indices of 1.9, 2.0 and 2.1, respectively. FIG. 5 shows that the reflectivity of the mirror layers can be adjusted in such a way that there is a tradeoff between the contrast ratio and optical bandwidth of the device. While the embodiments of the invention presented above describe a modulator having a variable-length cavity in combination with a single fixed-length optical cavity, one of ordinary skill in the art will recognize that the invention also contemplates the provision of two or more variable-length cavities. The provision of such additional cavities allows greater flexibility in tailoring the optical characteristics of the modulator. Such additional cavities are provided by appropriately arranging additional multilayer mirrors above the three depicted in the embodiments presented above.

The invention claimed is:

1. A modulator for modulating an optical signal comprising:

a conductive substrate;

at least three multilayer mirrors disposed on said substrate, said mirrors being spaced apart from one another to define upper and lower optical cavities, said lower cavity having a fixed thickness approximately equal to a multiple of one-half of a wavelength of the optical signal, as measured within said lower cavity, said upper cavity being formed by an airgap having a variable thickness that in a first state is approximately equal to a multiple of one-half of a wavelength of the optical signal, as measured within said upper cavity, wherein a total reflectivity of said multilayer mirrors approaches a minimum value when said upper cavity is in its first state, said multilayer mirror located above said airgap including;

a conductive membrane having an optically transparent portion;

a flexible support for positioning the membrane in a first position wherein, under the action of a bias, the membrane moves to a second position, changing said air gap by a fraction of a wavelength of the optical signal, as measured in air, where the change from the first to the second position causes a change from a minimum total reflectivity to a maximum total reflectivity state.

2. The modulator of claim 1 where, under the action of bias, the flexible support flexes and the membrane moves toward the substrate.

3. The modulator of claim 2 where the substrate is a semiconductor.

4. The modulator of claim 2 where the substrate is silicon.

5. The modulator of claim 2 where the multilayer mirrors comprise a material selected from the group consisting of silicon nitride and silicon oxide.

6. The modulator of claim 2 where the membrane comprises a second layer of material.

7. The modulator of claim 6 where the second layer of material has a thickness approximately equal to one-quarter of a wavelength of the optical signal, as measured within the second layer.

8. The modulator of claim 6 where the second layer of material is the same material as the substrate.

9. The modulator of claim 6 where the second layer of material is polysilicon.

10. The modulator of claim 2 where at least a portion of the membrane is coated with a conductive material which is selected from the group consisting of aluminum, gold, platinum, tungsten and conducting silicon.

11. The modulator of claim 6 where the second layer of material is conductive.

12. The modulator of claim 11 where the flexible support comprises a plurality of flexible support arms.

13. The modulator of claim 12 where at least a portion of the flexible support arms are conductive.

* * * * *